US010493829B2

(12) United States Patent
Horneck

(10) Patent No.: US 10,493,829 B2
(45) Date of Patent: Dec. 3, 2019

(54) VEHICLE DOOR

(71) Applicant: GM GLOBAL TECHNOLOGY OPERATIONS LLC, Detroit, MI (US)

(72) Inventor: Michael Horneck, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 90 days.

(21) Appl. No.: 15/913,997

(22) Filed: Mar. 7, 2018

(65) Prior Publication Data

US 2018/0257461 A1    Sep. 13, 2018

(30) Foreign Application Priority Data

Mar. 7, 2017  (DE) .......................... 10 2017 002 243

(51) Int. Cl.
| | | |
|---|---|---|
| *B60J 5/04* | (2006.01) | |
| *B60J 1/17* | (2006.01) | |
| *B60J 10/74* | (2016.01) | |
| *B60J 1/00* | (2006.01) | |

(52) U.S. Cl.
CPC .............. *B60J 5/0402* (2013.01); *B60J 1/005* (2013.01); *B60J 1/17* (2013.01); *B60J 5/0408* (2013.01); *B60J 10/74* (2016.02)

(58) Field of Classification Search
CPC ...... B60J 5/0402; B60J 5/0406; B60J 5/0408; B60J 1/005; B60J 1/17; B60J 10/74; B60J 10/79
USPC ...................................................... 296/146.2
See application file for complete search history.

(56) References Cited

U.S. PATENT DOCUMENTS

| | | | |
|---|---|---|---|
| 374,256 A * | 12/1887 | Jury ........................... | B60J 1/17 49/211 |
| 1,684,636 A * | 9/1928 | Mendenhall ........... | B60J 1/2097 49/415 |
| 1,695,872 A * | 12/1928 | White, Jr. .............. | B60J 1/2097 292/343 |
| 2,527,515 A * | 10/1950 | Hardemon ............. | B60J 1/2097 49/440 |
| 2,539,064 A * | 1/1951 | Ernest .................... | B60J 1/2097 49/440 |
| 5,469,668 A * | 11/1995 | Heim ...................... | B60J 5/0402 49/349 |
| 2015/0283885 A1* | 10/2015 | Kyung ................... | B60J 5/0402 296/146.2 |
| 2017/0210215 A1* | 7/2017 | Clark ....................... | B60J 10/74 |
| 2018/0257461 A1* | 9/2018 | Horneck ................ | B60J 5/0402 |
| 2018/0339576 A1* | 11/2018 | Heppner .................... | B60J 1/17 |

* cited by examiner

*Primary Examiner* — Gregory A Blankenship
(74) *Attorney, Agent, or Firm* — Lorenz & Kopf, LLP

(57) ABSTRACT

A vehicle door includes a window frame delimiting a window aperture and a window pane that is adjustably positioned in the window aperture. The window frame includes a first leg having a first surface which is situated opposite a first edge of the window pane extending in the adjusting direction. The window frame also includes a second leg having a second surface which is located opposite a second edge of the window pane extending in the adjusting direction. At least the first surface of the first leg delimits a clearance of the window pane transversely to the adjusting direction. In a closed position, the first edge and the first surface touch one another at the height of an upper region of the first leg. At a height of a lower region of the first leg the first edge and the first surface run spaced from one another.

20 Claims, 3 Drawing Sheets

VEHICLE DOOR

CROSS-REFERENCE TO RELATED APPLICATION

This application claims priority to German Patent Application No. 102017002243.7, filed Mar. 7, 2017, which is incorporated herein by reference in its entirety.

TECHNICAL FIELD

The present disclosure pertains to a vehicle door with a height-adjustable window pane, in particular for a motor car.

BACKGROUND

In most conventional vehicle doors, lateral edges of the height-adjustable window pane are concealed in grooves of legs of a window frame. Because of manufacturing tolerances, minor deviation between the adjusting direction of the window pane and the longitudinal direction of the grooves can occur so that the gap between an edge of the window pane and the bottom of the groove receiving the edge can change during the course of the movement of the window pane. In a conventional door, such a deviation is no problem provided it does not become so large that the edge disengages from the groove or runs up against the bottom of the groove.

When however at least one of the lateral edges is not concealed in a groove but visible, it should then be ensured that at least in the closing position of the window, in which the lateral edge of the window pane is visible in maximum length, the gap between the edge and a surface of a leg located opposite can be minimized. Moreover, this gap should substantially be the same whenever the window is closed. It is desirable, furthermore, to achieve this minor, reproducible gap without increased requirements on the manufacturing tolerances of the components used in the vehicle door.

SUMMARY

According to the present disclosure, a vehicle door is provided with a window frame delimiting a window aperture and a window pane that is adjustable in the window aperture between a lowered open position and a raised closing position. The window frame includes a first and a second elongated leg. The first leg has a surface which is located opposite the first edge of the window pane extending in the adjusting direction. The second leg has a surface which is located opposite a second edge of the window pane extending in the adjusting direction. At least the surface of the first leg delimits a clearance of the window pane transversely to the adjusting direction of the window pane. In the closing position, the first edge and the surface touch one another at the height of an upper region of the first leg and run spaced from one another at the height of a lower region of the first leg.

On its own, the clearance of the window pane transversely to the adjusting direction would exclude that during every closing of the window a substantially equal gap width between the window edge and the surfaces of the first and second leg located opposite materializes. Combined with the course of the first edge and the surface of the first leg located opposite the former, the clearance however is decisive for being able to deflect the window pane in contact with the surface laterally, transversely to the first and second edge instead of being blocked by the same, so that a closing position of the window pane can be reproducibly achieved. Accordingly, the window pane, at least in the closed position, can be reliably positioned at a minor gap from the surface or the leg located opposite the positioning aid. In the open or partly open position of the window pane, without contact with the positioning aid, the position of the window pane transversely to the adjusting direction can vary. However this is not particularly noticeable since the vehicle as a rule is parked off with window panes in the closed position.

A positioning aid projecting into the window aperture can be mounted in the upper region of the first leg in order to establish the required course of the surface of the first leg. The positioning aid is preferably covered by a flexible sealing profile so that it does not come directly in contact with the first edge but deflects the sealing profile in this direction. The positioning aid can be concealed on the finish-assembled vehicle door in that it and the first edge are received in a groove of the first leg. The positioning aid can be engaged in an aperture of the congruent surface.

According to a first configuration, the positioning aid is shaped in one piece from flat material such as for example a sheet metal cutting. Such a positioning aid can be engaged in the opening with the help of retaining claws, which are formed on both sides of a center piece of the positioning aid projecting from the congruent surface. The retaining claw can include at least three sections distributed along a same edge of the centre piece, of which at least one first section lies against an inside of the aperture and at least one second section lies against an outside of the aperture.

In order to achieve a tilt-proof anchorage in the aperture, the first section can be arranged between two sections or the second between two first sections. Alternatively, the positioning aid can be at least partly injection-moulded from a plastic.

The case may occur that the vehicle door is distorted following the assembly in order to relieve internal stresses. In order to be able to take into account such a distortion and nevertheless maintain a desired gap width between window pane and leg, the extent of the positioning aid can be adjustable transversely to the adjusting direction. For such an adjustment, an adjusting screw can be provided which extends through the aperture of the first leg. Preferably, an end of the adjusting screw facing away from the window aperture is accessible for the adjusting.

The adjustable positioning aid can include a base plate lying against the congruent surface and a flexible centre piece for guiding the edge of the window pane, the edges of which are held on the base plate and the middle of which is adjustable by the adjusting screw. The gap that is open towards an outside of the door is then preferably provided between the second edge of the window pane and the surface of the second leg located opposite the former.

Usually, the window aperture is delimited by an upper leg which connects upper ends of the first and of the second leg. In order to stabilise the window pane in closing position, this upper leg can include a groove in which an upper edge of the window pane engages in the closing position.

Preferably, the positioning aid is so near an upper end of the first leg that the first edge of the window pane can reach the positioning aid only when the upper edge on route into the closing position has passed the lower edge of the upper leg. A driving force acting on the window pane for overcoming the positioning aid can be increased without risk as soon as the upper edge of the window pane has passed the lower edge of the upper leg.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
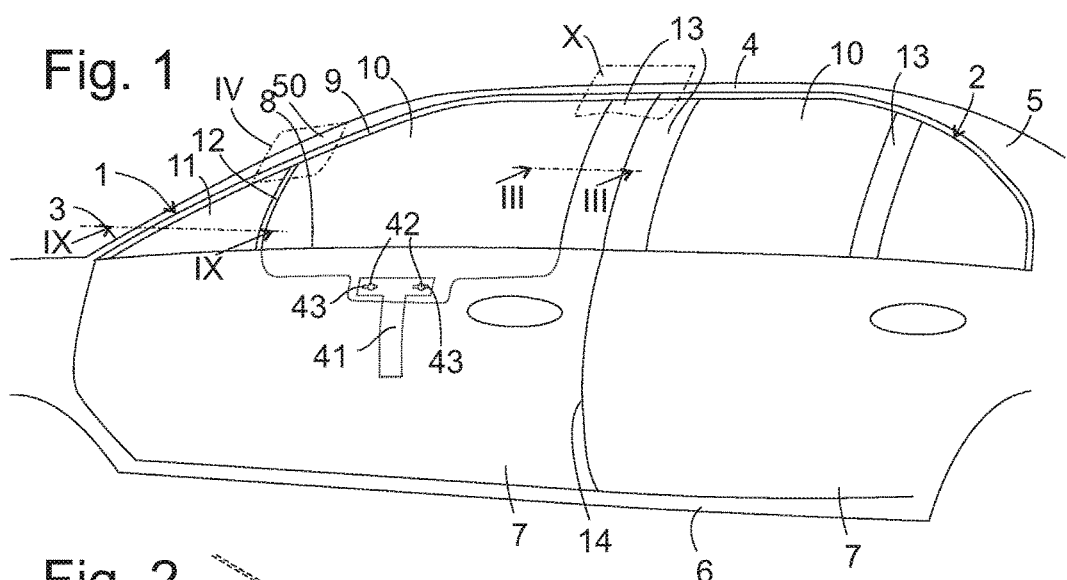
FIG. 1 is a lateral view of two doors of a vehicle body according to the present disclosure.

FIG. 1 shows a flank of a vehicle body with a front door 1 and a rear door 2. The doors 1, 2 fill a common aperture of the body, which is delimited by an A-pillar 3, a lateral roof frame 4, a C-pillar 5 and a sill 6. A B-pillar is concealed behind edges of the doors 1, 2 facing one another.

Each of the doors 1, 2 include a hollow door body 7 below a belt line 8 and a window frame 9 above the belt line 8. The window frames 9 each surround a large-area window aperture with a window pane 10, which is moveable between the position filling the window aperture shown in FIG. 1 and a position in which it is lowered into the hollow door body 7. A triangular gusset 11 of the front door 1 can be filled with an immovable window pane or with a trim component, on which an outside mirror or a cover (not shown in the figure) is anchored in a conventional manner.

The moveable window panes 10 are each laterally framed by legs 12, 13 of the window frame 9 extending in their adjusting direction. The legs 13 of the two doors 1, 2 are situated opposite one another in front of the B-pillar on both sides of a gap 14.

A lower edge of the window pane 10 and a slider 41 fastened thereto, which are both concealed in the interior of the hollow door body 7, are illustrated in broken lines. The slider 41 is guided on rails of the hollow door body 7 in order to drive the opening and closing movement of the window pane 10. Because of manufacturing tolerances, these rails are not exactly parallel to the legs 12, 13 so that the width of a gap between a leg 12, 13 and an edge of the window pane 10 facing it varies during the course of the movement of the window pane 10. In order to ensure that the movement of the window pane 10 cannot be blocked by running up against one of the legs 12, 14, the connection between slider 41 and window pane 10 maintains clearance transversely to the adjusting direction. For example, pins 42 of the slider 41 horizontally penetrate elongated holes 43 of the window pane 10 transversely to the adjusting direction.

Figure 2:
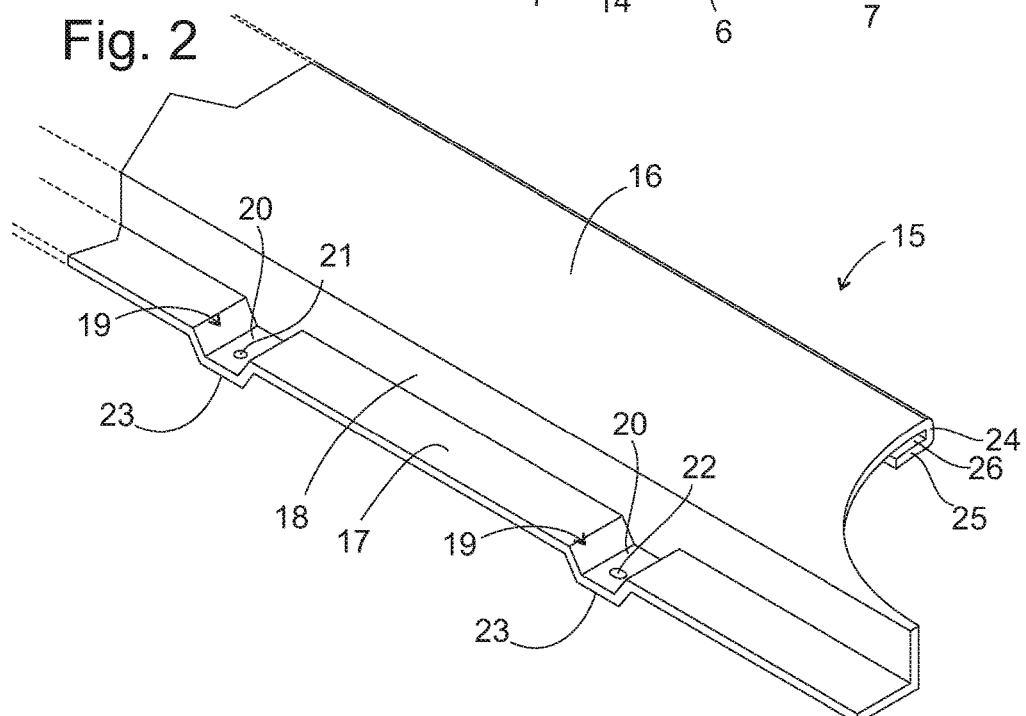
FIG. 2 is a perspective view of a panel.

FIG. 2 shows in a perspective view a panel 15, which forms the part of the leg 13 that is visible in FIG. 1 on the outside of the vehicle body. The panel 15 can be produced from sheet metal or from plastic—for design reasons preferably metallized on the surface. A visible section of the panel 15 that is exposed after assembling the doors 1, 2 on their outside is marked 16. A web 17 follows on a longitudinal edge of the visible section 16 facing the beholder in FIG. 2, here approximately at a right angle. The web 17 that is oriented parallel to the visual section and in turn borders a web 18.

Along a surface of the web 17 facing towards the outside, recesses 19 are distributed. Each of the recesses 19 has a bottom 20 with a round hole 21 or an elongated hole 22. The elongated hole is elongated in the longitudinal direction of the web 17, i.e. in the adjusting direction of the window pane 10. Here, projections 23 are located opposite each of the recesses 19 on a surface of the web 18 facing the vehicle interior.

A longitudinal edge of the visible section 16 facing away from the beholder is followed by an intermediate section 24 that is arcuate or semi-circular in the cross-sectional shape and by a retaining section 25 that is approximately parallel with the visual section 16 and together with the visual section 16 forms a hem and delimits a groove 26.

Figure 3:
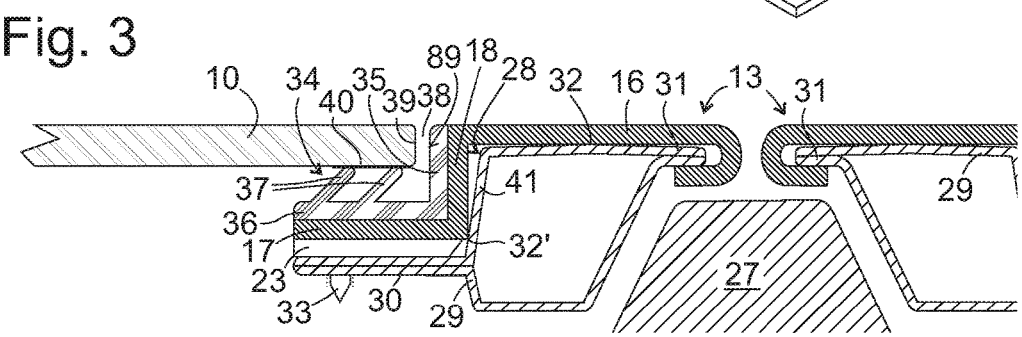
FIG. 3 is a schematic cross section through a part of a window frame of a vehicle door with a pillar and a panel mounted on the pillar.

FIG. 3 shows a section through the leg 13 along a horizontal plane marked in FIG. 1. The B-pillar is marked 27. On both sides of the B-pillar 27, pillars 28 of the doors 1 and 2 extend parallel to the B-pillar 27. The pillars 28 each include a central section 29 and two webs 30, 31 adjacent once to the window aperture and once to the respective door 2 or 1 on the opposite side of the B-pillar 27. Typically, the pillar 28 is joined from two stampings which are connected to one another along the webs 30, 31 and surround a hollow space of the central section 29.

The intermediate section 24 of the panel 15 engages about the web 31 so that the retaining section 25 extends on the inside of the web 31. Visual section 16 and pillar 28 touch one another at a point 32. The web 18 are fastened to the web 30 of the pillar 28 with the help of screws 33 extending through the apertures 21, 22. Heads of the fasteners 33 are each received in the recesses 19 of the web 18. In that the fasteners 33 keep the projections 23 pressed against the web 30, they impart a bending stress to the panel 15 so that the retaining section 25 is elastically pressed against the inside of the web 31.

An elastic sealing profile 34 is fixed onto the outside of the web 18 between the recesses 19 and covers the heads of the fasteners 33 in the recesses 19 so that from the outside, through the window pane 10, the sealing profile 34, but not the recesses 19 and the heads of the fasteners 33 therein are visible at most.

The sealing profile 34 is extruded in one piece from elastomer material and includes a leg 35 lying against the web 18, a leg 36 lying against the web 17 and at least one, here two sealing lips 37, which project from the leg 36 and lie against an inside of the window pane 10. A surface 89 of the leg 35 is situated opposite the edge 39 of the window pane 10, while a gap 38 extends between both. The sealing profile 34 is preferably fastened to one of the webs 17, 18 by an adhesive. At its edge, the window pane 10 can be provided with an opaque coating 40 in order to render the sealing profile 34 also invisible from the outside.

The outsides of the visual section 16 and of the window pane 10 extend flush with one another on both sides of the gap 38. On the one hand, the width of the gap 38 can change during the course of the movement of the window pane 10 since, as explained above, the movement direction of the slider 41 is not exactly parallel with the legs 12, 13 and on the other hand it can assume different values because of the clearance between window pane 10 and slider 41 even with the window pane 10 stationary. In order to ensure that at least in when closing, the window pane and in particular the width of the gap 38 assumes a reproducible fixed position, a positioning aid 44 is provided on the leg 12 which is shown in a longitudinal section of the leg 12 in FIG. 4.

The leg 12 has a groove that is open towards the window aperture, in which an upright edge 45 of the window pane 10 is guided. The section of FIG. 4 runs along this groove and shows the bottom 46 of the same and a sidewall 41 located behind the section plane. At a corner 48, the leg 12 merges into an upper leg 49 of the window frame 9 which in the closed position of the door 1 lies against an upper part of an A-pillar 50 (see FIG. 1) and against the roof frame 4. The edge 45 of the window pane 10 engages between the side walls 47 of the groove.

Figure 4:
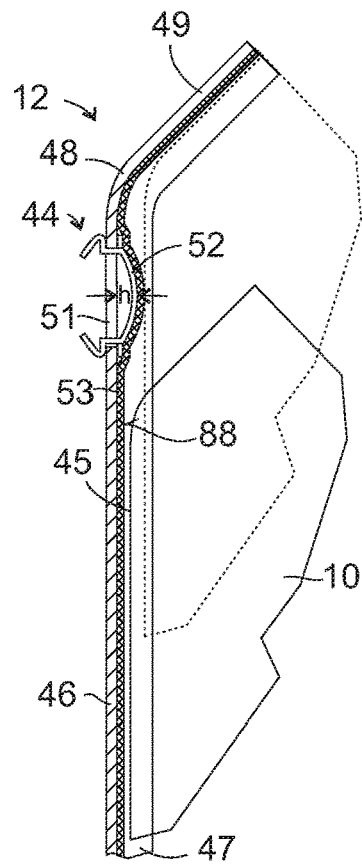
FIG. 4 is a longitudinal section through a leg delimiting a window aperture of the vehicle door.

An aperture 51 is cut into the bottom 46 a short distance below the corner 48, in which the positioning aid 44 is anchored. A arcuate-shaped head region 52 of the positioning aid 44 projects into the groove. In the representation of FIG. 4, the head region 52 is concealed under an elastic sealing profile 53 lining the groove. Alternatively, an aperture could also be cut into the sealing profile 53 through which the head region 52 engages into the interior of the groove.

A portion of the window pane 10 is shown in a partly open position using continuous lines. Its edge 45 runs parallel to the bottom 46 of the groove or a surface 88 of the sealing profile 53. When the window pane 10 is moved upwards from this position, an upper end of the edge 45 runs up against the positioning aid 44 and is laterally deflected by the same so that the edge 45 moves away from the surface 88 and the gap 38 on the opposite edge 39 of the window pane narrows. The width of the gap 38 that remains when the window pane 10 in the closing position runs up against the leg 49 and its edge 45 is located opposite the positioning aid 44 is independent of the accuracy of the parallelism between the adjusting direction of the window pane 10 and the legs 12, 13 and only determined by the gap of the legs 12, 13, the width of the window pane 10 and the horizontal dimension h of the head region 52. For this reason, it can be adjusted to a desired value by suitably dimensioning the head region 52.

In a partly open position of the window pane 10, in which the edge 45 no longer overlaps with the positioning aid 44, widths of the gap deviating from this desired value are possible. However, this can be tolerated since with the stationary vehicle the window pane 10 is normally closed and with the travelling vehicle there is no opportunity for closely looking at the gap 38.

Figure 5:
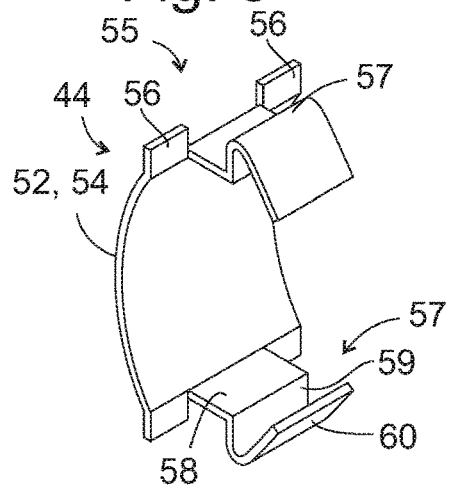
FIG. 5 is a perspective view of a positioning aid according to a first configuration.

FIG. 5 shows the positioning aid 44 in a perspective view. It is formed in one piece from a sheet metal stamping, preferably from a spring plate. Its head region 52 includes a arcuate or cylindrically curved middle piece 54, on the straight edges of which retaining claws 55 are formed. The retaining claws 55 each include two outer sections 56, which in this case are configured as tabs which in the assembled state lie against the side of the bottom 46 facing the window pane 10. A middle section 57 in the form of a barbed hook includes a shank section 58 engaging through the aperture 51 of the bottom 46. A retaining section 59 extends parallel to the outer sections 56 and which in the assembled state lies against a side of the bottom 46 facing away from the window pane 10. An introduction bevel 60 follows the retaining section 59. The positioning aid 44 can be assembled in that it is pushed into the aperture 51 of the bottom 46 from the side of the window aperture. Here, the bevels 60 initially come into contact with the edges of the aperture 51 and are deflected towards one another so that they finally pass the aperture 51. Having passed through the aperture 51, they elastically spread apart so that the retaining sections 59 and the outer sections 56 come to lie against opposite sides of the bottom 46 and fix the positioning aid 44 in the aperture 51. The number of the sections 56, 57 of a retaining claw 55 can also be greater than three or the middle sections of the retaining claw can be embodied as tabs and the outer ones as barbed hooks.

Figure 6:
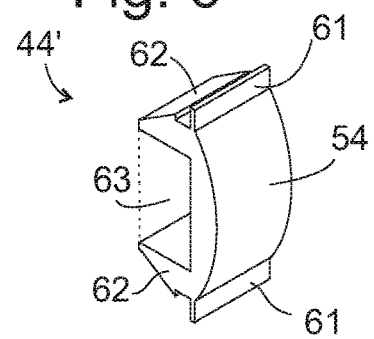
FIG. 6 is a perspective view of a positioning aid according to a second configuration.

FIG. 6 shows a positioning aid 44' according to a second configuration. This positioning aid 44' is injection-molded from a plastic that is elastically deformable within limits. Positioning aid 44' also includes a cylindrically curved middle piece 54 and tabs 61 projecting from edges of the middle piece 54 located opposite one another and barbed hooks 66 penetrating the aperture 51 of the bottom 46. An intermediate space 63 between the barbed hooks 62, as indicated by a dashed line, can be filled or a plate extend between the barbed hooks 62 in order to stiffen the barbed hooks 62 when necessary.

Figure 7:
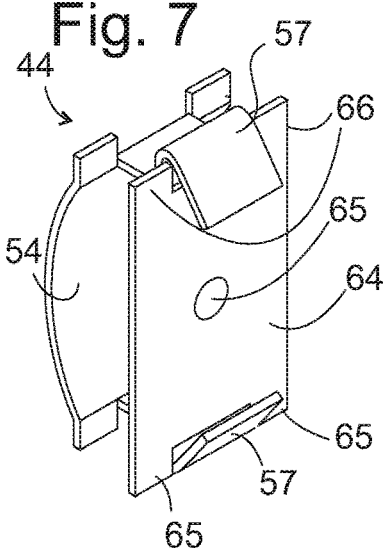
FIG. 7 is a perspective view of an adjustable positioning aid according to a third configuration.

The positioning aid 44 of FIG. 7 corresponds to that of FIG. 5, complemented by a plate 64 provided with a threaded bore 65. Two edges of the plate 64 engage between the retaining sections 59 and the introduction bevels 60 and are secured in this position by tabs 66 projecting on both sides of the middle sections 57. The threaded bore 65 is provided in order to receive an adjusting screw such that an end of the adjusting screw pushes against the middle piece 54 from the inside for driving the middle piece 54 and the plate 64 apart. Since in the assembled state the edges of the aperture 51 limit a spreading-apart of the middle sections 57, the plate 64 cannot escape from its position captured between the middle sections 57 such that the positioning aid 44 can adapt to the pressure of the adjusting screw only by a greater curvature of the middle piece 54, i.e. an enlargement of the dimension h shown in FIG. 4.

Figure 8:
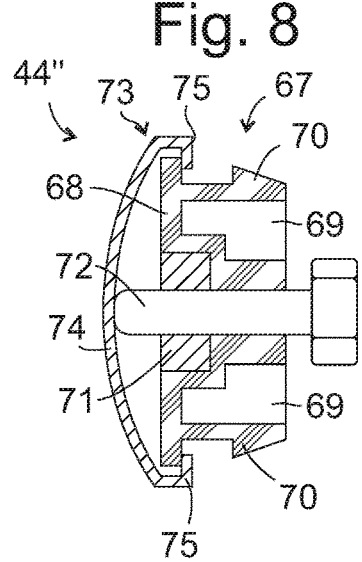
FIG. 8 is a perspective view of an adjustable positioning aid according to a fourth configuration.

FIG. 8 shows a further configuration of an adjustable positioning aid 44". A basic body 67 of plastic includes a base plate 68, the edges of which, like the tabs 61 of the positioning aid 44', lie against the bottom 46 of the groove of the leg 13 when barbed hooks 70 projecting from the base plate 68 and connected by stiffening walls 69 act on the side of the bottom 46 facing away from the window aperture. An internal thread of the basic body 67 can be formed by a nut 71 recessed into the base plate 68. An adjusting screw marked 72 is screwed into the nut 71.

A clamp 73, for example made of spring steel, has a middle piece 54 arching over the base plate 68 that is held splayed out from the base plate 68 by the adjusting screw 72 and two hooks 75 angled off on straight edges of the middle piece 74 engaging about the edges of the base plate 68. Here, too, the dimension h of the positioning aid 44" is adjustable with the help of the adjusting screw 72.

Figure 9:
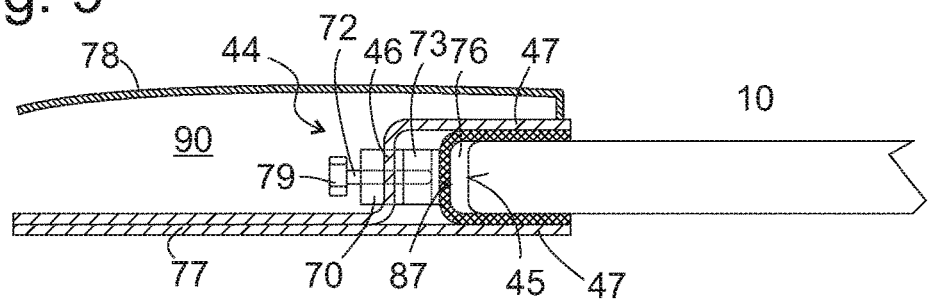
FIG. 9 is a cross section through a leg delimiting the window aperture with an adjustable positioning aid.

FIG. 9 shows a schematic section through the leg 12 and the gusset 11 of the door 1 adjoining thereon along a horizontal section plane marked IX-IX in FIG. 1. Noticeable is the groove, marked 76, in which the edge 45 of the window pane 10 engages and the positioning aid 44 arranged below the section plane. The bottom 46 and the side walls 47, which delimit the groove 76, are connected to a wall plate 77, which fills the gusset 11. Together with a detachable cover 78, the wall plate 77 delimits an intermediate space 90 into which an end 79 of the adjusting screw 72 projects. This end 79 is shown as an external hexagon head in the drawing; obviously, other head shapes are also possible. For reasons of space, the adjusting screw 72 can be embodied as grub screw, in the case of which the end 79 can be provided with an internal hexagon for engaging a tool. When the cover 78 is removed, the end 79 is accessible and the dimension 8 of the positioning aid 44 can be adjusted by turning the adjusting screw 72.

Figure 10:
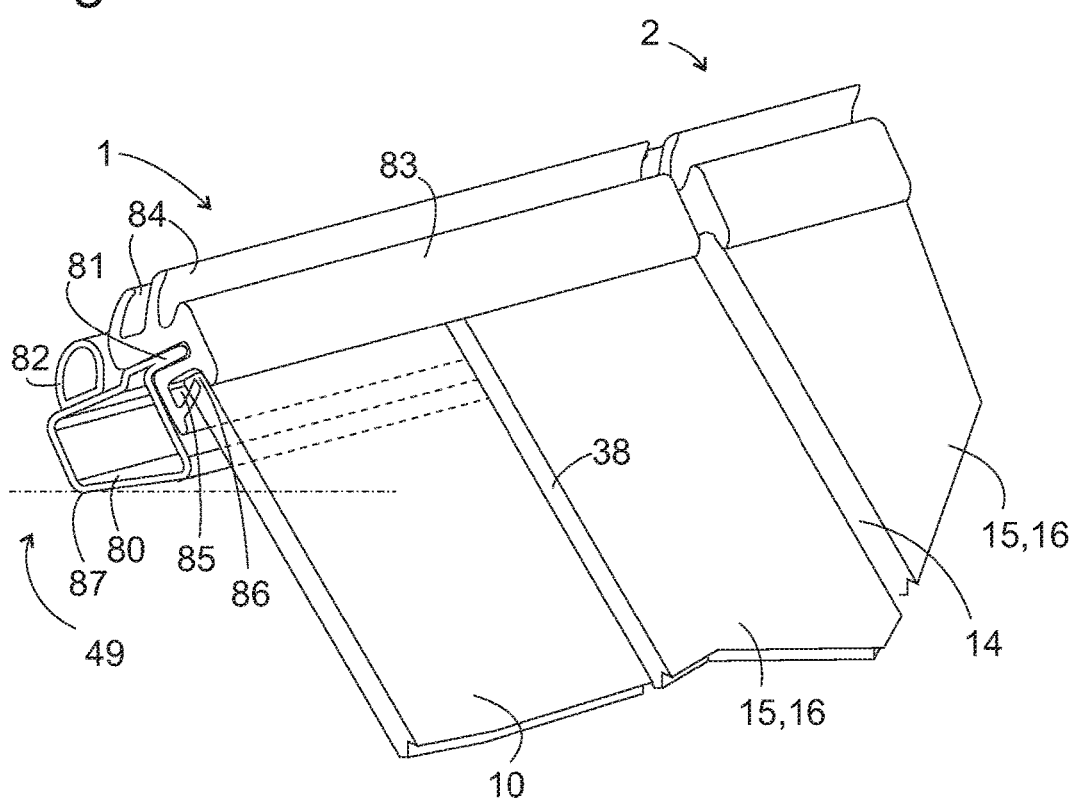
FIG. 10 shows an upper edge region of the vehicle door partly in perspective view, partly in section.

FIG. 10 shows the detail X from FIG. 1 in an enlarged partly sectioned view. The section runs through the window aperture of the door 1 filled by the window pane 10 and the upper leg 49 of the window frame 9 delimiting the window aperture towards the top. The upper leg 49 includes a hollow section 80 made of steel which, like the pillar 28, includes a projecting web 81. On a top side of the hollow section 80, a sealing profile 82 made of elastomer is fastened which, in the closed position of the door 1, is compressed flat in contact with the lateral roof frame 4. A profile 83 extruded from plastic is fitted onto the web 81. The plastic can also be an elastomer in the case of the profile 83; in order to improve the grip on the web 81, stiffening inserts can be embedded in the elastomer. On a top side of the profile 83, sealing lips 84 for lying against the lateral roof frame 4 are formed. Below the web 81, the profile 83 forms a groove 85 that is open towards the bottom which in the closing position receives an upper edge 86 of the window pane 10.

When the window pane during the course of an upwards movement passes a lower edge 87 of the upper leg 49, the height of the positioning aid 44 on the leg 12 can be practically selected so that the upright edge 45 reaches the positioning aid 44 only in particular when the upper edge 86 is situated above the lower edge 87. In order to simultaneously lift and shift the window pane 10 in transverse direction at the height of the positioning aid 44, a greater driving force than for lifting the window pane 10 on its own may be necessary.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

What is claimed is:

1. A vehicle door with a window frame delimiting a window aperture and a window pane that is adjustable in the window aperture between a lowered open position and a raised closed position, wherein the window frame comprises:
    a first leg having a first surface situated opposite a first edge of the window pane extending in the adjusting direction;
    a second leg having a second surface situated opposite a second edge of the window pane extending in the adjusting direction;
    a positioning aid mounted in an upper region of the first leg and projecting into the window aperture;
    a flexible sealing profile covering the positioning aid; and
    wherein the first leg, the positioning aid, and the flexible sealing profile delimit a clearance of the window pane transversely to the adjusting direction such that, in the closed position, the first edge is deflected by the positioning aid with the first edge abutting the window frame proximate the upper region of the first leg and such that, in the closed position, the first edge and the first surface run spaced from one another at a lower region of the first leg.

2. The vehicle door according to claim 1, wherein the first edge and the positioning aid are received in a groove of the first leg.

3. The vehicle door according to claim 1, wherein the positioning aid comprises a one-piece stamped metal component.

4. The vehicle door according to claim 1, wherein the positioning aid defines an extent (h) of projection into the window aperture transversely to an adjusting direction of the window pane, wherein the extent is adjustable.

5. The vehicle door according to claim 1, further comprising an upper frame member connecting upper ends of the first and second legs and delimiting the window aperture, wherein the positioning aid is located adjacent an upper end of the first leg such that the positioning aid engages the window pane only after an upper edge of the window pane is positioned above a lower edge of the upper leg.

6. A vehicle door with a window frame delimiting a window aperture and a window pane that is adjustable in the window aperture between a lowered open position and a raised closed position, wherein the window frame comprises:
    a first leg having a first surface situated opposite a first edge of the window pane extending in the adjusting direction;
    a second leg having a second surface situated opposite a second edge of the window pane extending in the adjusting direction;
    a positioning aid mounted in an upper region of the first leg and projecting into the window aperture;
    wherein the positioning aid engages an aperture formed in the first leg; and
    wherein the first leg and the positioning aid delimit a clearance of the window pane transversely to the adjusting direction such that, in the closed position, the first edge is deflected by the positioning aid with the first edge abutting the window frame proximate the upper region of the first leg and such that, in the closed position, the first edge and the first surface run spaced from one another at a lower region of the first leg.

7. The vehicle door according to claim 6, wherein the positioning aid comprises a comprised one-piece stamped metal component.

8. The vehicle door according to claim 6, wherein the positioning aid comprises an arcuate middle portion and two retaining claws projecting from the arcuate middle portion and engaging an edge of the aperture.

9. The vehicle door according to claim 8, wherein each retaining claw comprises a tab engaging a first side of the aperture, a shank extending through the aperture and a retaining section engaging a second side of the aperture opposite the first side.

10. The vehicle door according to claim 6, wherein the positioning aid defines an extent (h) of projection into the window aperture transversely to an adjusting direction of the window pane, wherein the extent is adjustable.

11. The vehicle door according to claim 10, further comprising an adjusting screw threadably engaging the positioning aid and configured to adjust the extent of the positioning aid.

12. The vehicle door according to claim 11, wherein an end of the adjusting screw facing away from the window aperture is accessible for the adjusting.

13. The vehicle door according to claim 11, wherein the positioning aid further comprises a base plate lying against the first leg and a flexible middle piece having edges secured to the base plate, wherein the adjusting screw is configured to adjust the extent extend of the flexible middle piece into the aperture.

14. The vehicle door according to claim 6, further comprising an upper frame member connecting upper ends of the first and second legs and delimiting the window aperture, wherein the positioning aid is located adjacent an upper end of the first leg such that the positioning aid engages the window pane only after an upper edge of the window pane is positioned above a lower edge of the upper leg.

15. The vehicle door according to claim 6, wherein the first edge and the positioning aid are received in a groove of the first leg.

16. A vehicle door with a window frame delimiting a window aperture and a window pane that is adjustable in the window aperture between a lowered open position and a raised closed position, wherein the window frame comprises:
   a first leg having a first surface situated opposite a first edge of the window pane extending in the adjusting direction;
   a second leg having a second surface situated opposite a second edge of the window pane extending in the adjusting direction;
   a positioning aid mounted in an upper region of the first leg and projecting into the window aperture;
   wherein the first leg and the positioning aid delimit a clearance of the window pane transversely to the adjusting direction such that, in the closed position, the first edge is deflected by the positioning aid with the first edge abutting the window frame proximate the upper region of the first leg and such that, in the closed position, the first edge and the first surface run spaced from one another at a lower region of the first leg; and
   wherein the second edge of the window pane and the second surface delimit a gap that is open towards an outside of the door.

17. The vehicle door according to claim 16, wherein the first edge and the positioning aid are received in a groove of the first leg.

18. The vehicle door according to claim 16, wherein the positioning aid comprises a one-piece stamped metal component.

19. The vehicle door according to claim 16, wherein the positioning aid defines an extent (h) of projection into the window aperture transversely to an adjusting direction of the window pane, wherein the extent is adjustable.

20. The vehicle door according to claim 16, further comprising an upper frame member connecting upper ends of the first and second legs and delimiting the window aperture, wherein the positioning aid is located adjacent an upper end of the first leg such that the positioning aid engages the window pane only after an upper edge of the window pane is positioned above a lower edge of the upper leg.

* * * * *